(12) United States Patent
Edenfeld et al.

US008839586B2

(10) Patent No.: US 8,839,586 B2
(45) Date of Patent: Sep. 23, 2014

(54) TOWER SECTION AND METHOD FOR INSTALLING TOWER FOR WIND TURBINE

(75) Inventors: Thomas Edenfeld, Osnabrück (DE); Matthias Wiehn, Osnabrück (DE)

(73) Assignee: General Electric Company, Schanectady, NY (US)

( * ) Notice: Subject to any disclaimer, the term of this patent is extended or adjusted under 35 U.S.C. 154(b) by 0 days.

(21) Appl. No.: 13/617,040

(22) Filed: Sep. 14, 2012

(65) Prior Publication Data
US 2014/0075860 A1    Mar. 20, 2014

(51) Int. Cl.
E04H 12/08    (2006.01)

(52) U.S. Cl.
USPC ........... 52/651.07; 52/207; 52/20; 52/745.17; 49/33

(58) Field of Classification Search
CPC ....... E04H 12/34; E04H 12/00; E04H 12/085; F03D 11/0075; F05B 2240/912; E05F 5/003; E06B 5/01; E06B 3/4636
USPC ....... 52/173.1, 651.01, 650.3, 40; 416/244 R; 49/366, 370, 159, 158, 130
See application file for complete search history.

(56) References Cited

U.S. PATENT DOCUMENTS

| | | | | |
|---|---|---|---|---|
| 203,343 A * | 5/1878 | Jackson | ........................... | 49/367 |
| 699,468 A * | 5/1902 | Jackson | ........................... | 49/33 |
| 879,200 A * | 2/1908 | Schrader | ........................... | 49/367 |
| 951,280 A * | 3/1910 | Jones | ........................... | 49/208 |
| 1,475,917 A * | 11/1923 | Ayers et al. | ........................... | 49/370 |
| 1,647,836 A * | 11/1927 | Lyons | ........................... | 49/36 |
| 1,947,515 A * | 2/1934 | Blackburn | ........................... | 220/567 |
| 2,174,989 A * | 10/1939 | Lyons | ........................... | 49/367 |
| 2,582,540 A * | 1/1952 | Gruse | ........................... | 49/367 |
| 3,529,382 A * | 9/1970 | Salvarola | ........................... | 49/411 |
| 4,541,208 A * | 9/1985 | Vesperman et al. | ........................... | 52/19 |
| 5,732,512 A * | 3/1998 | Ueno et al. | ........................... | 52/19 |
| 6,113,079 A * | 9/2000 | Urbanski et al. | ........................... | 261/114.5 |
| 6,116,179 A * | 9/2000 | Swinbanks et al. | ........................... | 114/269 |
| 7,350,332 B2 * | 4/2008 | Petridis et al. | ........................... | 49/122 |
| 7,428,800 B1 * | 9/2008 | Vaughn et al. | ........................... | 52/19 |
| 7,740,107 B2 | 6/2010 | Lemburg et al. | | |
| 7,757,437 B2 * | 7/2010 | Schulte et al. | ........................... | 49/141 |
| 7,762,037 B2 * | 7/2010 | Meiners | ........................... | 52/651.01 |
| 7,805,893 B2 * | 10/2010 | Scholte-Wassink | ........................... | 52/40 |
| 8,083,029 B2 | 12/2011 | Teichert | | |
| 8,201,378 B2 * | 6/2012 | Meiners | ........................... | 52/651.04 |
| 2007/0125037 A1 * | 6/2007 | Meiners | ........................... | 52/720.1 |
| 2007/0296220 A1 * | 12/2007 | Kristensen | ........................... | 290/55 |
| 2009/0126309 A1 * | 5/2009 | Lyness et al. | ........................... | 52/650.3 |
| 2010/0122508 A1 | 5/2010 | Kristensen | | |
| 2010/0139180 A1 | 6/2010 | Meiners | | |

(Continued)

Primary Examiner — Brent W Herring
(74) Attorney, Agent, or Firm — Dority & Manning, P.A.

(57) ABSTRACT

Tower sections for towers of wind turbines and methods for installing towers of wind turbines are disclosed. A tower includes a preassembled power module having a first cross-sectional area. The tower section includes a wall having an inner surface and an outer surface. The inner surface defines a tower interior and has a first diameter. The tower section further includes a tower flange extending from the wall into the tower interior and having a second diameter less than the first diameter. Further, the tower section includes a platform assembly affixed to the wall and having a third diameter greater than the second diameter. The platform assembly defines an aperture having a second cross-sectional area greater than the first cross-sectional area.

20 Claims, 6 Drawing Sheets

(56) References Cited

U.S. PATENT DOCUMENTS

| | | |
|---|---|---|
| 2010/0186342 A1 | 7/2010 | Ollgaard |
| 2011/0140437 A1 | 6/2011 | Vemuri et al. |
| 2011/0252720 A1 | 10/2011 | Kristensen |
| 2012/0066998 A1* | 3/2012 | Tobinaga ............... 52/651.01 |
| 2013/0174508 A1* | 7/2013 | Reed et al. ............... 52/655.1 |
| 2013/0174509 A1* | 7/2013 | Reed et al. ............... 52/655.1 |
| 2013/0240297 A1* | 9/2013 | Aquino et al. ............ 182/113 |

* cited by examiner

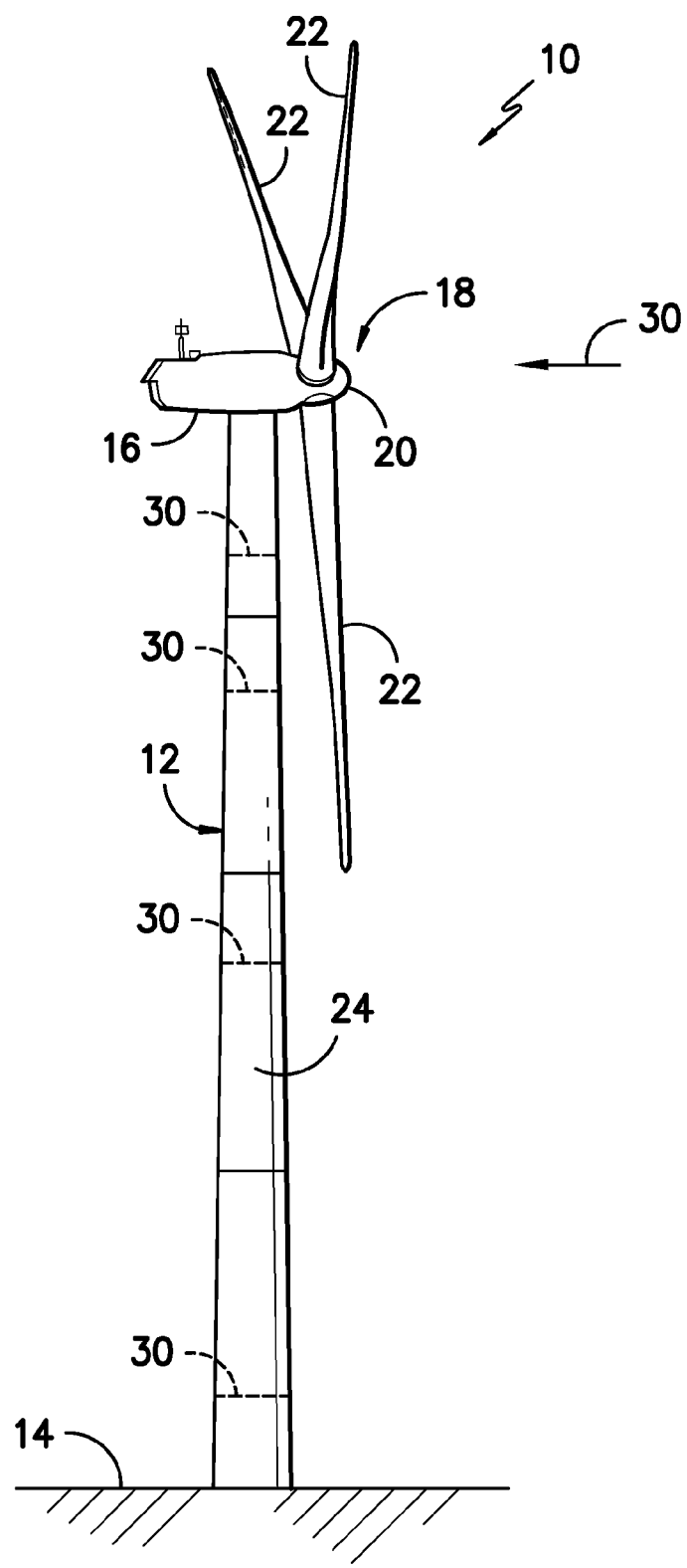
FIG. -1-

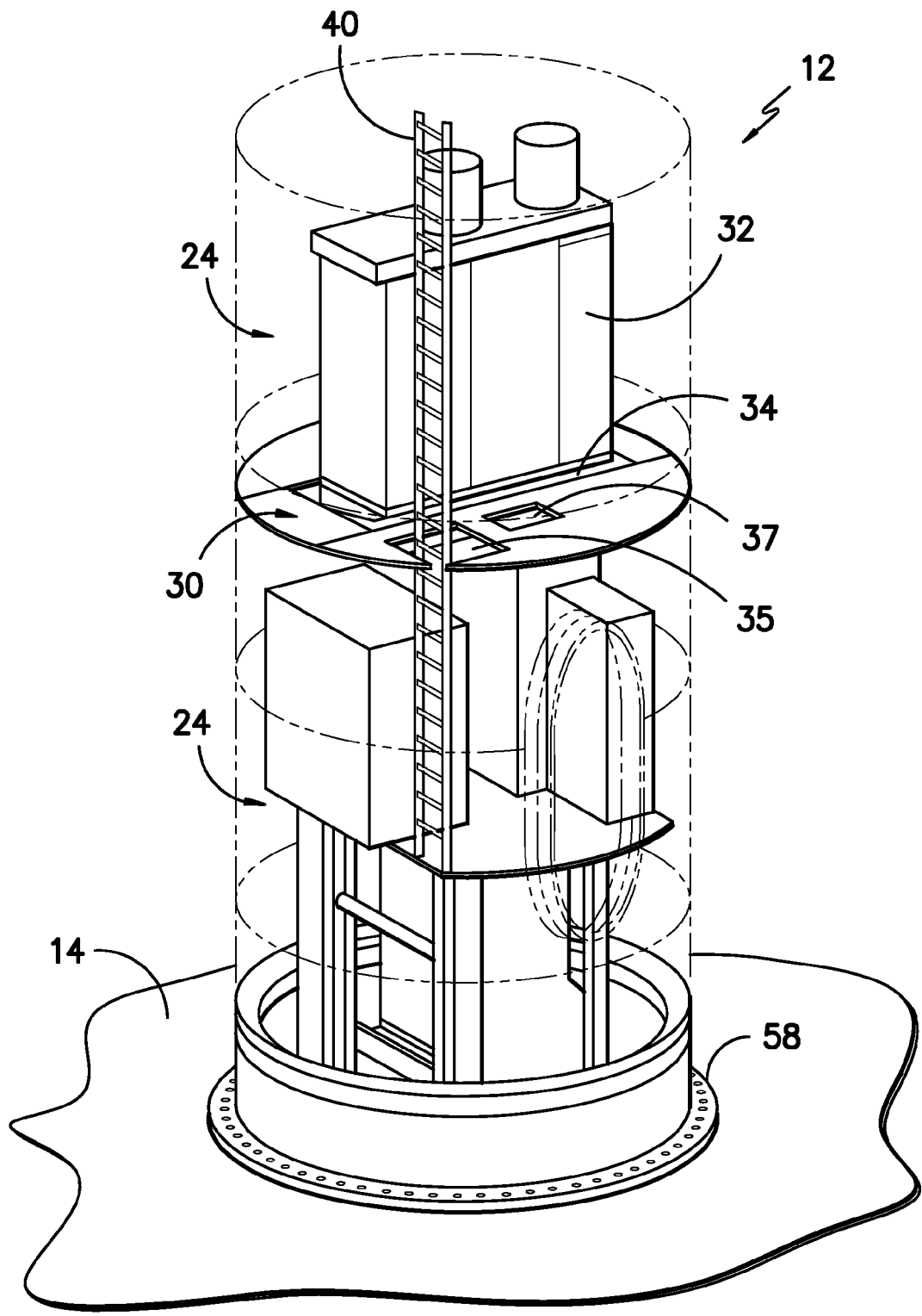
FIG. -2-

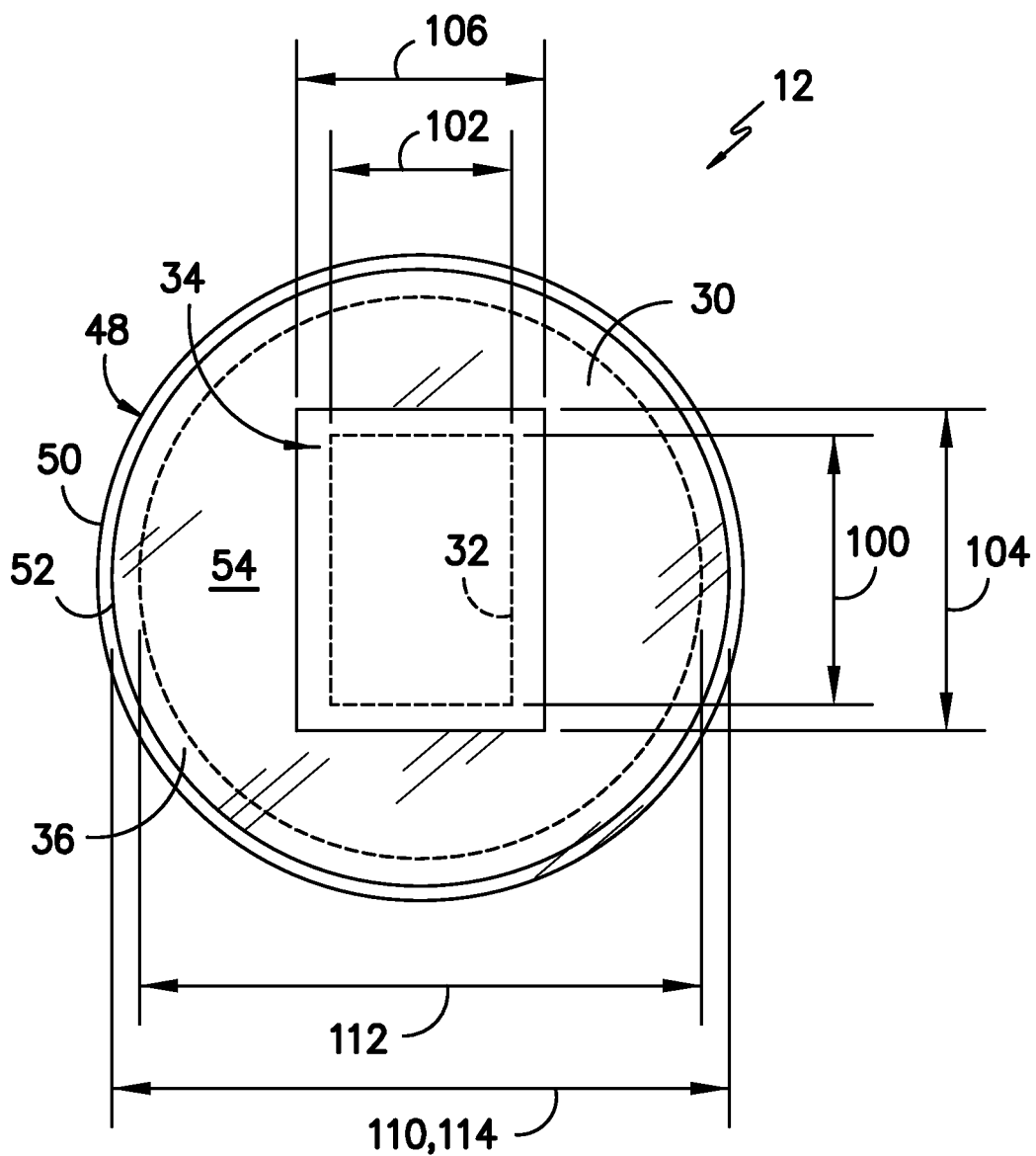
FIG. -3-

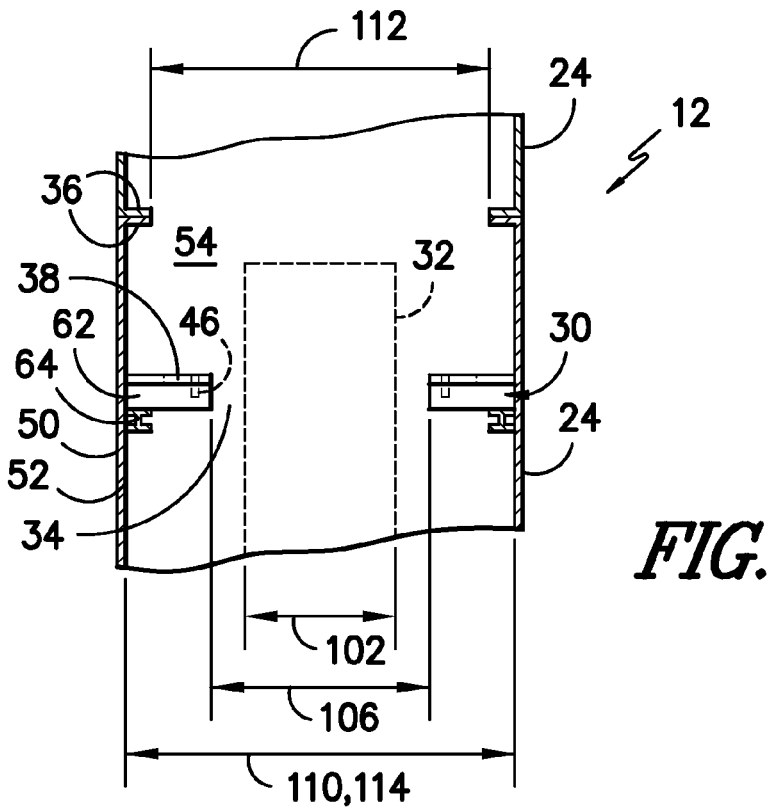
FIG. -4-
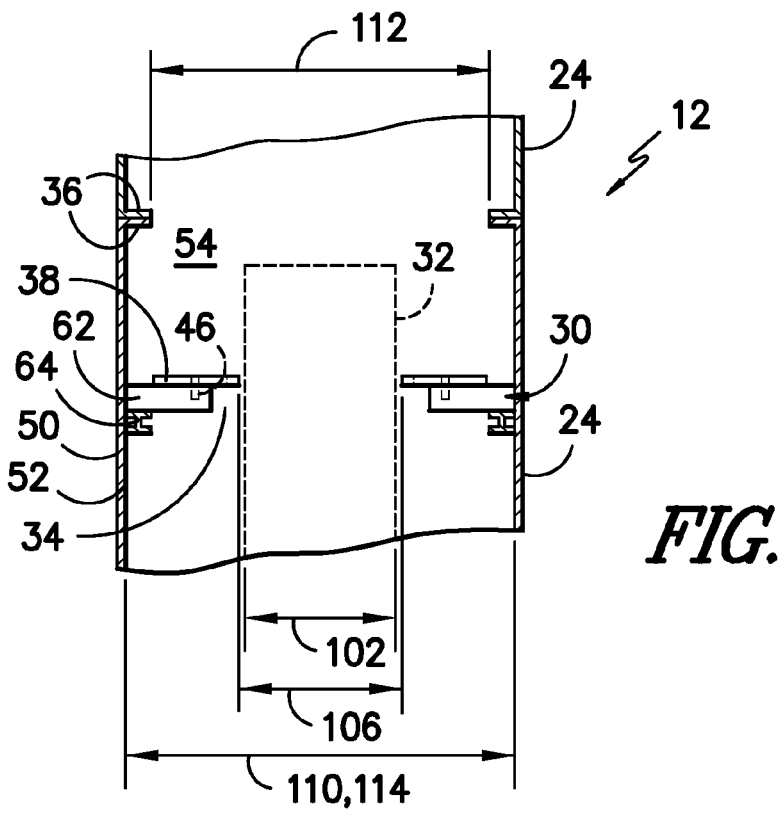
FIG. -5-

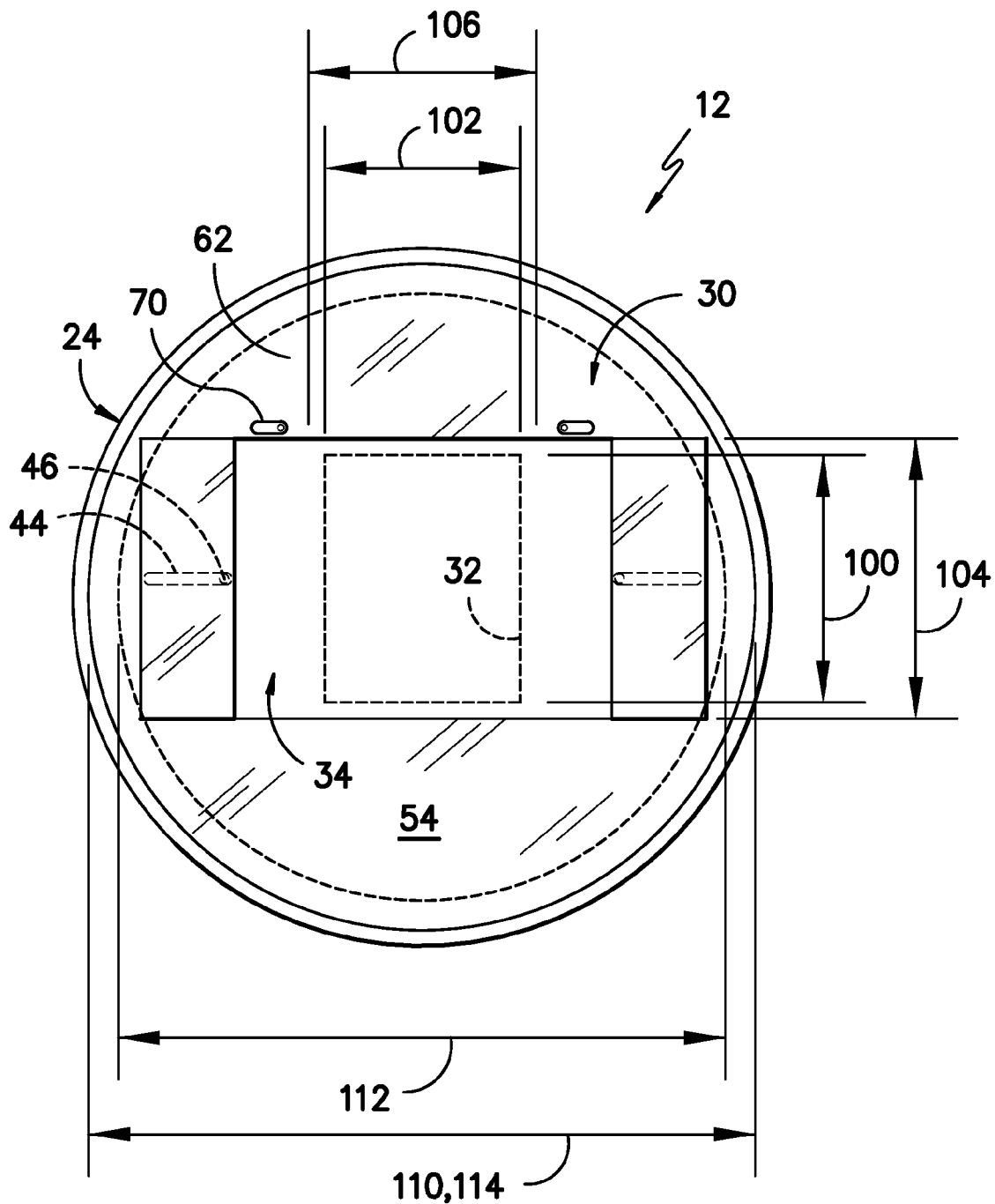
FIG. —6—

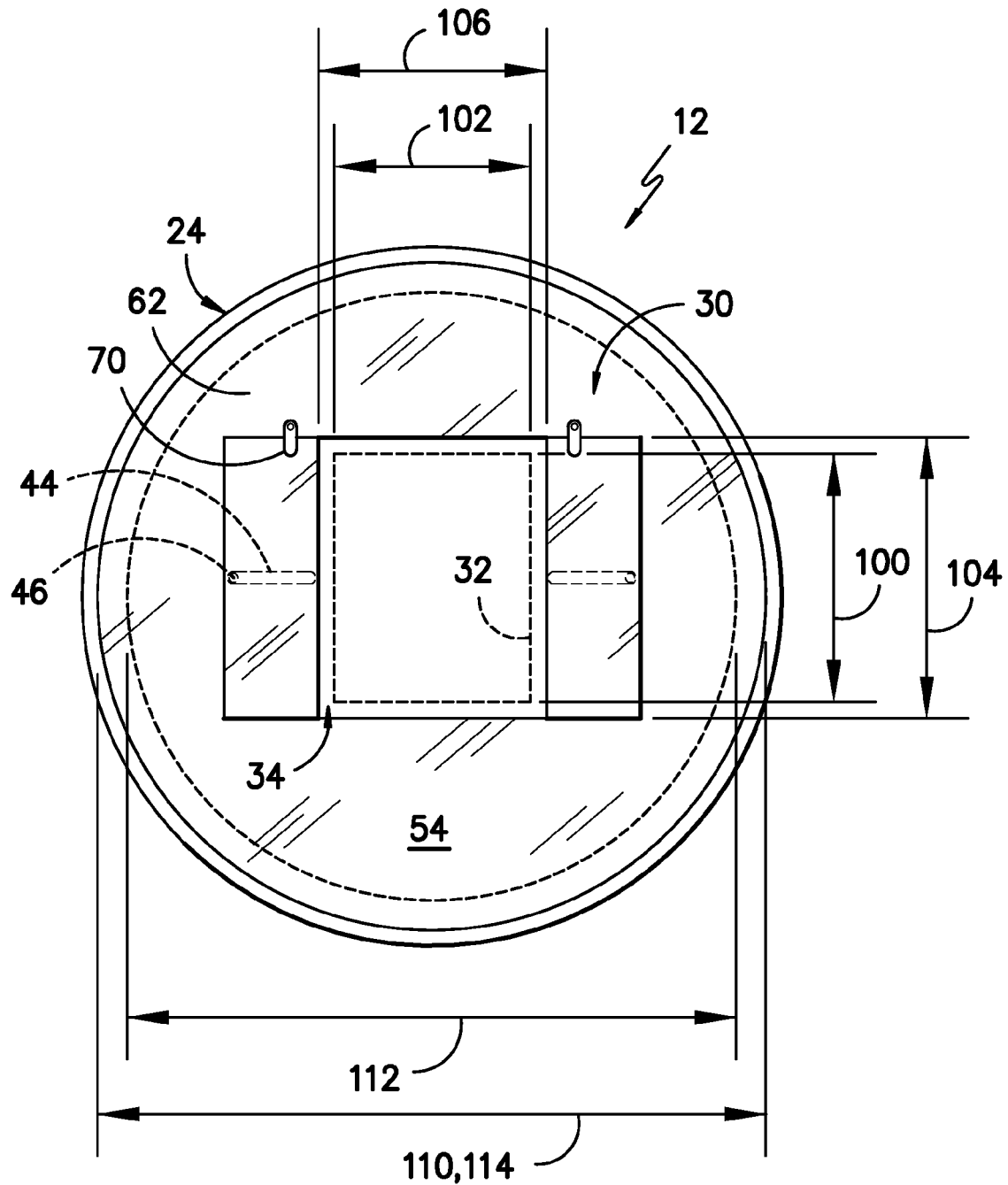
FIG. -7-

TOWER SECTION AND METHOD FOR INSTALLING TOWER FOR WIND TURBINE

FIELD OF THE INVENTION

The present subject matter relates generally to wind turbines and, more particularly, to a tower for a wind turbine having an integrated preassembled power module (PPM) platform assembly.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Platforms in wind turbine towers provide operators safe access to areas of a wind turbine that may require servicing, maintenance, and inspection. For example, platforms are typically located adjacent to tower flange bolts for safe and easy inspection. Further, platforms are typically located adjacent to preassembled power modules for inspection and maintenance purposes.

A conventional wind turbine having a platform is installed by first installing a foundation, mounting associated equipment and preassembled power modules to the foundation, assembling one or more tower sections on the foundation around the equipment and/or preassembled power module, and then installing required platforms in the tower sections around the equipment and/or preassembled power module.

Platforms are typically installed by lifting a number of steel beams by a crane and lowering them into the tower sections. The steel beams are then secured to the tower wall. A significant number of bosses, clip plates, and the like are then used to mount the platforms to the beams. Steel beams and associated component parts are thus generally difficult and costly to install.

Additionally, each tower section includes flanges for coupling the tower section to other tower sections. As the tower flange extends into the tower section and thus has a smaller inner diameter than the tower wall, platforms must have a smaller inner diameter than the tower flanges to fit past the tower flanges and into the tower during installation. This causes a gap between the platform and wall of the tower section. These gaps can cause significant safety issues. Thus, additional components are required to be installed on the platform to cover the gaps, which is a costly and time consuming process.

In light of the above, improved tower sections for wind turbine towers and improved methods for installing wind turbine towers would be desired in the art. For example, a tower section including a platform assembly that reduces installation time and expense as well as safety concerns would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a tower section for a tower of a wind turbine is disclosed. The tower includes a preassembled power module having a first cross-sectional area. The tower section includes a wall having an inner surface and an outer surface. The inner surface defines a tower interior and has a first diameter. The tower section further includes a tower flange extending from the wall into the tower interior and having a second diameter less than the first diameter. Further, the tower section includes a platform assembly affixed to the wall and having a third diameter greater than the second diameter. The platform assembly defines an aperture having a second cross-sectional area greater than the first cross-sectional area.

In another embodiment, a method for installing a tower of a wind turbine to a foundation is disclosed. The method includes installing a preassembled power module having a first cross-sectional area on a foundation; and assembling a tower section on the foundation surrounding the preassembled power module. The tower section has a wall having an inner surface and an outer surface. The inner surface defines a tower interior and has a first diameter. The tower section further includes a tower flange extending from the wall into the tower interior and has a second diameter less than the first diameter. Further, the tower section includes a platform assembly affixed to the wall and having a third diameter greater than the second diameter. The platform assembly defines an aperture having a second cross-sectional area greater than the first cross-sectional area. Upon assembling of the tower section, the aperture surrounds the preassembled power module.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a three-dimensional view of one embodiment of a tower having a plurality of tower sections and an integrated platform assembly according to the present disclosure;

FIG. 3 illustrates a top view of one embodiment of a tower section having an integrated platform assembly according to the present disclosure;

FIG. 4 illustrates a cross-sectional view of one embodiment of a tower section having an integrated platform assembly with platform extension panels in an un-extended position according to the present disclosure;

FIG. 5 illustrates a cross-sectional view of one embodiment of a tower section having an integrated platform assembly with platform extension panels in an extended position according to the present disclosure;

FIG. 6 illustrates a top view of one embodiment of a tower section having an integrated platform assembly with platform extension panels in an un-extended position according to the present disclosure; and FIG. 7 illustrates a top view of one embodiment of a tower for a wind turbine having an integrated platform assembly with platform extension panels in an extended position according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

The tower 12 includes a plurality of tower sections 24 assembled atop one another. The tower 12 may be made of any number of tower sections 24. For example, in the illustrated embodiment, tower 12 includes four tower sections 24. One or more tower sections 24 may include one or more platform assemblies 30, as discussed above. Further, one or more platform assemblies 30 included in the tower 12 may be integrated with a tower section 24, as discussed below.

The platform assemblies 30 provide operators safe access to areas of the wind turbine 10 that may require servicing, maintenance, and inspection. For example, platform assemblies 30 may be located adjacent to tower flange bolts for safe and easy inspection, or may be located adjacent to preassembled power modules 32 for inspection and maintenance purposes. A preassembled power module according to the present disclosure is an assembly of electrical components utilized in the wind turbine 10. For example, converter electronics, voltage switch gear, and transformers may be utilized and included in a preassembled power module 32. The location of a platform assembly 30 within a tower section 24 may vary so as to accommodate the needs of a specific wind turbine 10.

FIG. 2 illustrates a three-dimensional view of a tower 12 with a plurality of tower sections 24 having an integrated platform assembly 30. The tower 12 includes preassembled power module 32 with a first cross-sectional area. The preassembled power module 32 may be installed on foundation 58. Any suitable foundation formed from any suitable material may be utilized. The preassembled power module 32 may be installed on the foundation 58 by, for example, placing the preassembled power module 32 directly on the foundation 58, or by placing the preassembled power module 32 on a pedestal that is placed on the foundation 58. The first cross-sectional area is generally a maximum first cross-sectional area, taken in a view as shown for example in FIGS. 6 and 7. The first cross-sectional area may have any suitable shape and size. For example, in some embodiments, the preassembled power module 32 may be generally rectangular, and thus have a generally rectangular cross-sectional area. The cross-sectional area in these embodiments is defined by a length 100 and a width 102. In other embodiments, the preassembled power module 32, and thus the cross-sectional area thereof, may have a circular or oval shape, a hexagonal shape, or any other suitable polygonal shape. A tower section 24 that generally surrounds the preassembled power module 32 may include a platform assembly 30 having an aperture 34 with a second cross-sectional area, taken in a view as shown for example in FIGS. 6 and 7. The aperture 34 may generally be defined in a platform plate 62 of the platform assembly 30, as discussed below. Similar to the first cross-sectional area, the second cross-sectional area may have any suitable shape and size. For example, in some embodiments, the aperture 34 may be generally rectangular, and thus have a generally rectangular cross-sectional area. The cross-sectional area in these embodiments is defined by a length 104 and a width 106. In other embodiments, the aperture 34, and thus the cross-sectional area thereof, may have a circular or oval shape, a hexagonal shape, or any other suitable polygonal shape. It should be understood that the aperture 34 may have a similar or different cross-sectional shape than the preassembled power module 32. The second cross-sectional area of the aperture 34 may be greater than the first cross-sectional area of the preassembled power module 32, thereby allowing the preassembled power module 32 to fit through the aperture 34 such that the aperture 34 generally surrounds the preassembled power module 32. Further, as illustrated, the platform assembly 30 may include additional apertures 35, 37 thereby allowing other equipment to pass through the platform assembly 30. For example, as illustrated, a ladder 40 is allowed to pass through additional aperture 35. The platform assembly 30 may have as many apertures as necessary to accommodate various equipment and/or preassembled power modules within the tower 12.

As shown in FIG. 3, a top view of a platform assembly 30 affixed to a tower section 24 is illustrated. The tower section 24 has a wall 48. The wall 48 generally defines a perimeter of the tower section 24, and thus may have a generally polygonal cross-section. For example, in some embodiments, the wall 48 may be generally cylindrical, with a generally circular cross section. Alternatively, the wall 48 may have any suitable shape. The wall 48 has an inner surface 52 and an outer surface 50. The inner surface 52 defines a tower interior 54 and has a first diameter 110. In exemplary embodiments, the first diameter 110 is a maximum diameter. Further, it should be understood that the term "diameter" encompasses the term "width", in cases wherein the tower interior 54 is not, for example, circular or oval in cross-section. The tower section 24 further includes a tower flange 36. The tower flange 36 may be provided to couple the tower section 24 with an adjacent tower section 24 stacked on top of or below the tower section 24. The flange 36 may thus extend from the wall 48 into the tower interior 54. For example, the flange 36 may be integral with the wall 48, or may be a separate component from the wall 48. The flange 36 may be located at a top end or bottom end of the wall 48, and may be configured for coupling to a flange of an adjacent tower section. Further, the flange 36 may extend peripherally about the wall 48 or any portion(s) thereof. The tower flange 36 has a second diameter 112. The second diameter 112 may be measured between inward-most points on the flange 36 relative to the inner surface 52 and tower interior 54, and may in exemplary embodiments be a maximum diameter. The second diameter 112 may thus be less than the first diameter 110.

FIGS. 4 through 7 further illustrate tower sections 24 according to the present disclosure. As discussed, previously known platforms required a smaller diameter than the second diameter 112 defined by the tower flanges 36 to allow the platform to pass by the tower flanges 36 for installation in the tower section 24 after the tower section 24 was installed. This caused a significant gap between the inner surface 52 of the wall 48 and the platform. Platforms assemblies 30 according to the present disclosure, however, may be integrated with the tower section 24. Integrating of the platform assembly 30 with the tower section 24 means that the platform assembly 30 is installed in the tower section 24 before the tower section 24 is installed around a preassembled power module 32. Thus, when the tower section 24 is installed on a tower foundation 58, the platform assembly 30 is already pre-installed in the tower section 24.

A platform assembly 30 according to the present disclosure thus includes a platform plate 62. The platform plate 62 may for example be a metal plate, such as a checker plate, or may be formed from any other suitable materials having any other suitable pattern or construction. The platform assembly 30 may further be affixed to the wall 48, such as to the inner surface 52 thereof. For example, in some embodiments, as shown, the platform assembly 30, such as the platform plate 62 thereof, may contact the inner surface 52. In these embodiments, the platform assembly 30, such as the platform plate 62, may be affixed to the wall 48 by, for example, welding, mechanical fastening (using nut-bolt combinations, rivets, nails, screws, bosses, plate clips, etc.) or other suitable affixation. Additionally or alternatively, a platform assembly 30 may include, for example, one of more beams 64. The beams 64 may be I-beams, L-beams, or any other beams having any other suitably-shaped cross-sections. Each beam 64 may be affixed to the wall 48, such as to the inner surface 52 thereof, and/or to the platform plate 62. For example, the beam 64 may be affixed to both the wall 48 and the platform plate 62 to support the platform plate 62 and affix the platform plate 62 to the wall 48.

The platform assembly 30 further defines a third diameter 114. The third diameter 114 may be a maximum diameter of the platform assembly 30, and specifically of the platform plate 62 thereof. Because the platform assembly 30 is preinstalled and integrated, the third diameter 114 of a platform assembly 30 according to the present disclosure is greater than the second diameter 112. In some embodiments, for example, the third diameter 114 may be equal to the first diameter 110. In these embodiments, the platform plate 62 may be flush with the inner surface 52 of the wall 48. In other embodiments, the third diameter 114 may be less than the first diameter 110. In some of these embodiments, the platform plate 62 may be, for example, affixed to beams 64, which in turn may be affixed to the wall 48. Advantageously, because the third diameter 114 is greater than the second diameter 112, previously existing gaps between the inner surface 52 and the platform plate 62 may be reduced or eliminated. This thus advantageously reduces or eliminates safety issues caused by these gaps, and further reduces the time and cost associated with installing additional component parts to cover these gaps.

As discussed above, the aperture 34 defined in a platform assembly 30, such as in a platform plate 62 thereof, may have a second cross-sectional area that is greater than a first cross-sectional area of a preassembled power module 32. Referring to FIGS. 4 through 7, two elevation views of a tower 12 having an integrated platform assembly 30 are illustrated. Both configurations illustrate an integrated platform assembly 30 having an aperture 34 with a second cross-sectional area that is greater than the first cross-sectional area of the preassembled power module 32. The relative cross-sectional area sizes allow for the tower section 24 to be installed on the foundation 58, by allowing the platform assembly 30 to fit over the preassembled power module 32. Thus, upon assembling of the tower section 24, the aperture 34 may generally surround preassembled power module 32, in the view as shown in FIGS. 4 and 5. FIGS. 4 and 5, as well as FIGS. 6 and 7 additionally illustrate platform extension panels 38. The platform extension panels 38 may be additional components of the platform assembly 30. One, two (as shown), three, four or more platform extension panels 38 may be provided. The platform extension panels 38 may be disposed peripherally around at least a portion of a perimeter of the aperture 34, in the view as shown in FIGS. 6 and 7. The platform extension panels 38 may serve multiple purposes. For example, the platform extension panels 38 may decrease the gap between the platform assembly 30 and the preassembled power module 32, while increasing the platform assembly 30 surface area. Thus, each platform extension panel 38 may be extendable inwardly, generally towards a center of the aperture 34. This allows for the gap caused by the difference between the first cross-section and the second cross-section to be decreased, thus reducing safety concerns caused by this gap to be reduced or eliminated.

In FIGS. 4 and 6, the platform extension panels 38 are in an un-extended position, while FIGS. 5 and 7 illustrates platform extension panels 38 in an extended position. This extended position decreases the cross-sectional area of the aperture 34, thereby providing a close tolerance between the integrated platform assembly 30 and the preassembled power module 32.

The platform extension panels 38 may be located anywhere on the integrated platform assembly 30 in order to provide appropriate extension of the integrated platform assembly 30. For example, as illustrated, the platform extension panels 38 are located on top of the platform plate 62. In other embodiments, the platform extension panels 38 may be located beneath the platform plate 62 or within the platform plate 62.

The platform extension panels 38 may be constructed of metal plates, including checker plates, similar to the platform plate 62, or may be constructed of any material suitable in the art.

The platform extension panels 38 may be secured to the platform plate 62 by any suitable methods or apparatus known in the art. For example, the platform extension panels 38 may be bolted, hinged, etc., to the platform plate 62 or other suitable component of the platform assembly 30. The platform extension panels 38 may be slidable, rotatable, or movable between the extended and un-extended positions using any suitable methods or devices known in the art. For example, in one embodiment, the platform extension panels 38 are slidable. In some of these embodiments, for example, platform extension panels 38 may be equipped with slide hole 44, as shown. Pins 46 may extend from the platform assembly 30 through the slide holes 44. A platform extension panel 38 may be slidable generally linearly between an un-extended position and an extended position by sliding the panel 38 such that the position of the pin 46 is moved within the slide hole 46. Alternatively, a pin 46 may extend through a rotation hole, and the panel 38 may be rotatable between an un-extended position and an extended position such that the hole is rotated about the pin 46.

In some embodiments, as further shown in FIGS. 6 and 7, a tower section 24 may include one or more locking mechanisms 70. A locking mechanism 70 may be, for example, a lock or a clamp. The locking mechanisms 70 are provided to secure the platform extension panels 38, such as when in the extended position and/or when in the un-extended position. As shown in FIGS. 6 and 7, for example, the locking mechanisms may be clamps. The clamps may swivel between engaged positions as shown in FIG. 7 and unengaged positions as shown in FIG. 6. Further, when in the engaged position, the clamps may further be clamped onto the panels 38 to secure the panels. When the panels 38 are secure, they are generally prevented from further extension or other movement.

FIGS. 4 and 5 also illustrate tower sections 24 connected by tower flanges 36. In the illustration, tower flanges 36 are L-flanges located inside the tower sections 24. Any suitable flanges 36, however, are within the scope and spirit of the present disclosure. The mating flanges of adjacent tower sections 24 may be secured together by any suitable methods or devices known in the art. For example, in one embodiment, the tower flanges 36 may be bolted together using appropriate tower flange nuts and bolts.

The present disclosure is further directed to methods for installing towers 12 of wind turbines 10 to foundations 58. A method may include, for example, installing a preassembled power module 32 having a first cross-sectional area on a foundation 58. The method may further include assembling one or more tower sections 24 on the foundation 58 surrounding the preassembled power module 32. It should be noted that a tower section 24 may be assembled directly on, and thus in contact with, the foundation 58, or the tower section 24 may be stacked on one or more other tower sections 24, one of which contacts the foundation 58. As discussed above, a tower section 24 may include a wall 48 having an inner surface 52 and an outer surface 50, the inner surface 52 defining a tower interior 54 and having a first diameter 110. The tower section 24 may further include a tower flange 36 extending from the wall 48 into the tower interior 54 and having a second diameter 112 less than the first diameter 110. The tower section 24 may further include one or more platform assemblies 30 affixed to the wall 48 and having a third diameter 114 greater than the second diameter 112, and may define an aperture 34 having a second cross-sectional area greater than the first cross-sectional area. Upon assembling of the tower section 24, the aperture 54 may surround the preassembled power module 32.

In some embodiments, a method may further include extending one or more platform extension panels 38 towards a center of the aperture 54, as discussed above. In still other embodiment, a method may include securing the platform extension panels 38, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tower section for a tower of a wind turbine, the tower comprising a preassembled power module having a first cross-sectional area, the tower section comprising:
   a wall comprising an inner surface and an outer surface, the inner surface defining a tower interior and having a first diameter;
   a tower flange extending from the wall into the tower interior and having a second diameter less than the first diameter; and
   a platform assembly affixed to the wall and having a third diameter greater than the second diameter, the platform assembly defining an aperture having a second cross-sectional area greater than the first cross-sectional area, the platform assembly comprising at least one platform extension panel disposed peripherally around at least a portion of a perimeter of the aperture, wherein a substantially central portion of the aperture is uncovered when the at least one platform extension panel is in fully extended position.

2. The tower section as in claim 1, wherein the platform assembly comprises a plurality of platform extension panels disposed peripherally around at least a portion of a perimeter of the aperture.

3. The tower section as in claim 1, wherein the platform extension panel is extendable towards a center of the aperture.

4. The tower section as in claim 1, wherein the platform extension panel is slidable.

5. The tower section as in claim 1, further comprising a locking mechanism for securing the platform extension panels.

6. The tower section as in claim 1, wherein the platform assembly defines a plurality of apertures.

7. The tower section as in claim 1, further comprising a plurality of platform assemblies.

8. The tower section as in claim 1, wherein the tower flange is an L-flange.

9. A wind turbine, comprising:
   a foundation; and
   a tower secured to the foundation, the tower comprising:
      a preassembled power module having a first cross-sectional area; and
      a plurality of tower sections, at least one of the tower sections comprising:
         a wall comprising an inner surface and an outer surface, the inner surface defining a tower interior and having a first diameter;
         a tower flange extending from the wall into the tower interior and having a second diameter less than the first diameter; and
         a platform assembly affixed to the wall and having a third diameter greater than the second diameter, the platform assembly defining an aperture having a second cross-sectional area greater than the first cross-sectional area, the platform assembly comprising at least one platform extension panel disposed peripherally around at least a portion of a perimeter of the aperture, wherein a substantially central portion of the aperture is uncovered when the at least one platform extension panel is in a fully extended position.

10. The wind turbine as in claim 9, wherein the platform assembly comprises a plurality of platform extension panels disposed peripherally around at least a portion of a perimeter of the aperture.

11. The wind turbine as in claim 9, wherein the platform extension panel is extendable towards a center of the aperture.

12. The wind turbine as in claim 9, wherein the platform extension panel is slidable.

13. The wind turbine as in claim 9, further comprising a locking mechanism for securing the platform extension panels.

14. The wind turbine as in claim 9, wherein the platform assembly defines a plurality of apertures.

15. The wind turbine as in claim 9, further comprising a plurality of platform assemblies.

16. The wind turbine as in claim 9, wherein the tower flange is an L-flange.

17. A method for installing a tower of a wind turbine to a foundation, the method comprising:
- installing a preassembled power module having a first cross-sectional area on a foundation;
- assembling a tower section on the foundation surrounding the preassembled power module, the tower section comprising:
  - a wall comprising an inner surface and an outer surface, the inner surface defining a tower interior and having a first diameter;
  - a tower flange extending from the wall into the tower interior and having a second diameter less than the first diameter; and
  - a platform assembly affixed to the wall and having a third diameter greater than the second diameter, the platform assembly defining an aperture having a second cross-sectional area greater than the first cross-sectional area;
- wherein upon assembling of the tower section the aperture surrounds the preassembled power module; and
- extending a platform extension panel of the platform assembly towards a center of the aperture, wherein a substantially central portion of the aperture is uncovered when the platform panel is in a fully extended position.

18. The method as in claim 17, wherein the extending step comprises extending a plurality of platform extension panels of the platform assembly towards a center of the aperture.

19. The method as in claim 18, further comprising securing the platform extension panel.

20. The method as in claim 17, wherein the tower section comprises a plurality of platform assemblies.

* * * * *

UNITED STATES PATENT AND TRADEMARK OFFICE
CERTIFICATE OF CORRECTION

| | | |
|---|---|---|
| PATENT NO. | : 8,839,586 B2 | Page 1 of 1 |
| APPLICATION NO. | : 13/617040 | |
| DATED | : September 23, 2014 | |
| INVENTOR(S) | : Thomas Edenfeld et al. | |

It is certified that error appears in the above-identified patent and that said Letters Patent is hereby corrected as shown below:

On the title page item 73 the Assignee name is misspelled. Please delete "Schanectady" and insert --Schenectady--

In the claims

In Column 8, line 19, insert --a-- after "...at least one platform extension panel is in..."

In Column 9, lines 4-5, "panels" should be "panel"

In Column 10, line 13, insert --extension-- after "...when the platform..."

Signed and Sealed this
Nineteenth Day of April, 2016

Michelle K. Lee
*Director of the United States Patent and Trademark Office*